(12) United States Patent
Kremer

(10) Patent No.: US 7,661,355 B2
(45) Date of Patent: Feb. 16, 2010

(54) MEAT PROCESSING

(76) Inventor: LaVerne Kremer, 1465 W. Macon, Decator, IL (US) 62522

( * ) Notice: Subject to any disclaimer, the term of this patent is extended or adjusted under 35 U.S.C. 154(b) by 920 days.

(21) Appl. No.: 10/940,278

(22) Filed: Sep. 14, 2004

(65) Prior Publication Data

US 2005/0066822 A1    Mar. 31, 2005

Related U.S. Application Data

(60) Provisional application No. 60/506,198, filed on Sep. 26, 2003.

(51) Int. Cl.
*A23L 3/005* (2006.01)
*A23L 3/22* (2006.01)
*F27B 9/22* (2006.01)
*F27B 9/40* (2006.01)
*F27D 19/00* (2006.01)

(52) U.S. Cl. .................. 99/451; 99/443 C; 99/483; 219/388; 426/248; 426/417

(58) Field of Classification Search .............. None
See application file for complete search history.

(56) References Cited

U.S. PATENT DOCUMENTS

| | | | | |
|---|---|---|---|---|
| 2,536,345 A | * | 1/1951 | Bradford | 426/417 |
| 2,793,582 A | * | 5/1957 | Rothe et al. | 99/443 C |
| 2,820,709 A | * | 1/1958 | Schack et al. | 426/388 |
| 3,114,638 A | * | 12/1963 | Huhn et al. | 426/417 |
| 3,135,190 A | * | 6/1964 | Lewis | 99/443 C |
| 3,412,671 A | * | 11/1968 | Solomon | 99/483 |
| 3,449,315 A | * | 6/1969 | Aikins | 426/417 |
| 3,616,747 A | * | 11/1971 | Lapeyre | 99/405 |
| 3,685,430 A | * | 8/1972 | McBride | 99/349 |
| 4,608,261 A | * | 8/1986 | MacKenzie | 426/242 |
| 4,939,346 A | * | 7/1990 | Bailey et al. | 219/388 |
| 5,382,444 A | | 1/1995 | Roehrig et al. | |
| 6,099,879 A | * | 8/2000 | Todd, Jr. | 426/240 |
| 6,575,084 B2 | | 6/2003 | Allen et al. | |

FOREIGN PATENT DOCUMENTS

DE    3915409 A1 *  11/1990

* cited by examiner

*Primary Examiner*—Joseph M Pelham
(74) *Attorney, Agent, or Firm*—Mark Manley

(57) ABSTRACT

A processor and process method for preparing pre-cooked ground meat. An augered heated tube allows meat to be cooked as it is tumbled and moved through the tube. The cooked ground meat can be mechanically degreased through a mechanical process such as spinning to provide a meat product that has a controlled fat content. Then the meat can be packaged and irradiated to provide a pre-cooked meat product that is easy to use and that has a long shelf life.

15 Claims, 3 Drawing Sheets

MEAT PROCESSING

RELATED APPLICATIONS

Applicant claims priority under 35 USC 119 to provisional patent 60/506,198 having a filing date of Sep. 26, 2003.

BACKGROUND OF THE INVENTION

In the meat processing industry it is desirable to be able to process meat in ways that are economical and safe and that produce a food product that is convenient and attractive for the consumer. It is also desirable to be able to control the quality of the meat produced. A number of prior art solutions have been developed to process meat in the best manner.

For working parents there is a need for convenience products. Specifically, meat products that are safe and appealing and yet that do not require extensive cooking and draining of water and grease typically associated with cooking a raw meat product. In addition many diets including the so called Atkins diet focus on meat as a major staple of the diet. For those on a diet high in meat, there is a need for more variety and convenience in the products currently available on the store shelf. There is a need for a variety of easy to prepare meat foods.

One common approach to meat processing has been to grind at least part of an animal carcass into a ground meat product that can be refrigerated or frozen then stored prior to sale to the consumer. It has also been common practice to form raw ground meat into shapes such as patties for the convenience of the end consumer. In the prior art there is a requirement for continuous cold storage, this can be a significant expense and it is common for frozen foods such as meat to be damaged in shipping due to partial thawing that can occur in shipping. Another problem with ground meat is that the grind often uses fatty meats that are high in cholesterol; there is a desire in many diets for meat that has a high percentage of lean.

U.S. Pat. No. 6,575,084 to Allen et al shows one prior art approach to processing and storing ground meat products. In the Allen patent, meat is ground and then raw meat is leveled and irradiated then formed into shapes and placed in cold storage. It is known in the prior art to irradiate raw meat to extend its shelf life and protect the consumer against harmful bacteria and to protect the producer against lawsuits and expensive product recalls. The process of Allen produces a ground meat product that still requires cold storage and cooking by the end consumer. Further the meat product of the Allen process is not processed in anyway to control the quality of the meat product in terms of fat content of the meat. In Allen the only control over the fat content of the final meat product is the meat chosen for the grind, this is common in the prior art.

U.S. Pat. No. 5,382,444 to Roehrig et al discloses a process of centrifuging raw ground meat to remove fat from the meat. In this patent the meat is slightly heated to aid in removal of fat but the patent is careful not to cook the meat so that it might still be formed into shapes for use by the end consumer.

As can be seen there is a need for a process of treating ground meat that produces a meat product that is safe and economical and yet that is easy to use for the consumer and that appeals to the consumer. There is further a need for a process that allows the producer to control the moisture and fat content of the end meat product.

SUMMARY OF THE INVENTION

The present invention relates to a processor and method of producing ground beef. The current invention seeks to produce a package of cooked ground beef that does not require additional cooking to be safe.

The present invention provides a process method and processor that cooks the meat as it is augered through a heated tube. Cooking is controlled by sensing temperature of the meat and moisture as it passes through the process. Meat is tumbled in the heated tube to continue mixing while preventing undesirable burning, sticking or clumping of the ground meat particles.

The present invention provides a method of removing grease from the meat to control fat content. Meat can be treated mechanically and/or centrifugally to remove some moisture and fat content.

These and other advantages of the present invention will become apparent from the detailed description of the invention.

DETAILED DESCRIPTION OF THE DEVICE

Figure 1:
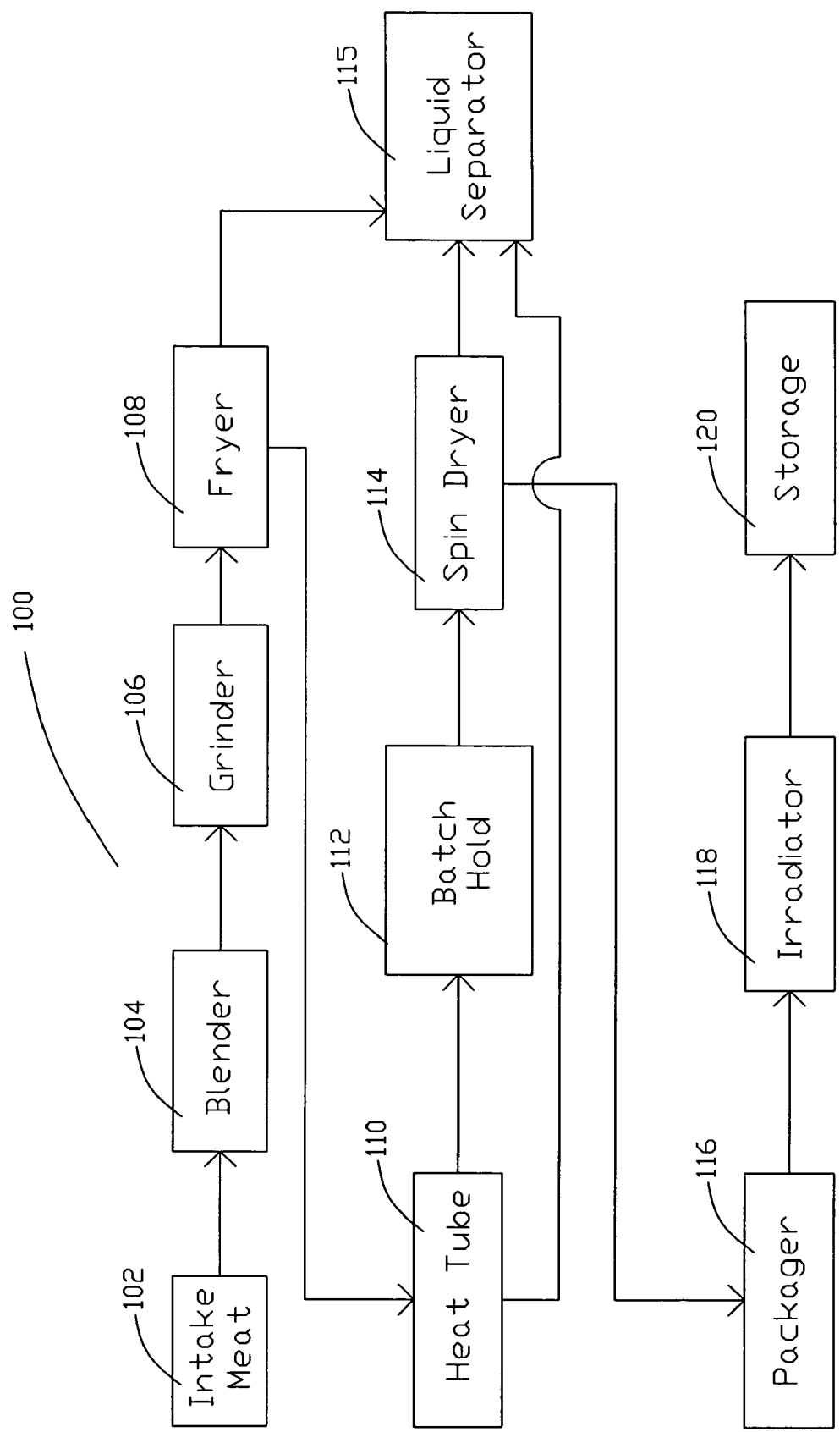
FIG. 1 shows schematic view of the processor.
Figure 1A:
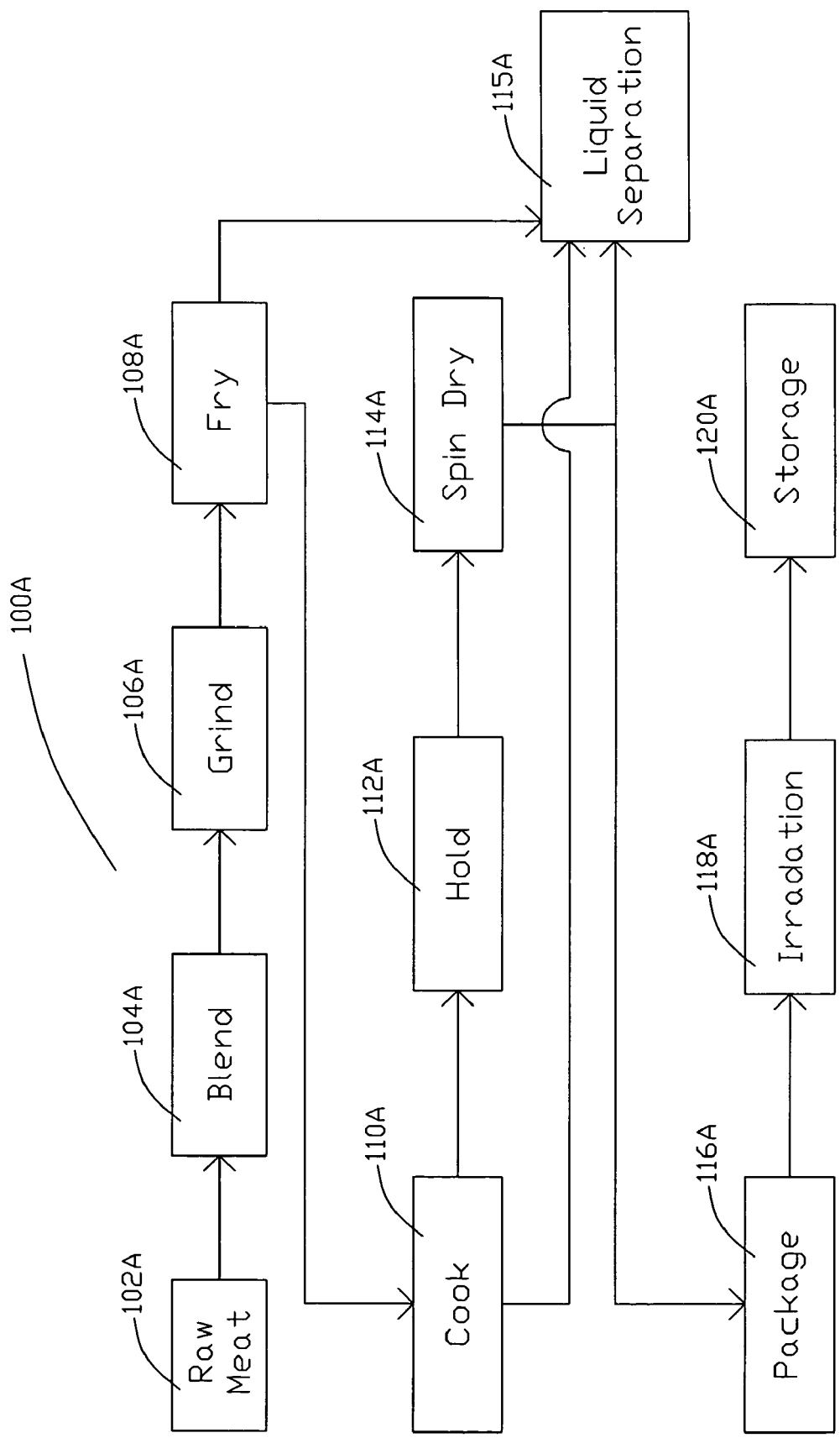
FIG. 1A shows the process

FIG. 1 shows a schematic view of the meat processor 100 and FIG. 1A the process 100A method. Raw meat 102A is introduced into the processor 100 at the meat intake 102. A producer can select the cuts of meat that will produce the end product desired. Different cuts of meat can be fed to a blender 104 to blend 104A and then a grinder 106 to grind 106A to produce a raw blended ground meat grind. The grind can then be fed into a batch cooker such as a deep fat fry 108 where the meat can partially fry 108A. The partially cooked meat can then be augered out of the deep fat fry 108 and into a heated tube 110 wherein the meat will be further cooked 110A in a controlled environment inside the heated tube 110. The temperature and humidity in the tube 110 can be controlled. The meat can be augered through the heat tube 110 and once fully cooked the meat can be placed in a fully cooked batch hold 112, 112A. Meat traveling through the heat tube 110 can be monitored to assure that a safe temperature, capable of destroying any unwanted bacteria or a temperature to meet any specification, has been reached. Next the meat can be placed into a mechanical drying processor 114. For example, the meat can be centrifugally spun dry 114A. Other mechanical drying processes such as absorption, allowing the meat to drip dry or squeezing moisture from the meat could also be applied alone or in combination. The amount of moisture and fat removed from the meat can be controlled by controlling, for example, the amount of centrifugal force applied and by controlling the time the mechanical drying occurs. Once the meat is dry it can be packaged 116A in a packager 116 to form meat packages, not shown, containing loose cooked ground meat and then the meat packages can be irradiated 118A by an irradiator 118 to kill unwanted bacteria. If properly sealed in packaging the resulting meat product could be stored 120, 120A at room temperature or with a minimum of cooling and still be safe. Liquid including fat and water from the cooking can be separated 115. The fat from the meat can be used to fuel the cooking or can be packaged for other markets or uses. If the process of removing fat removes too much water, then water could be placed back in the meat to raise the moisture content without raising the fat content.

Figure 2:
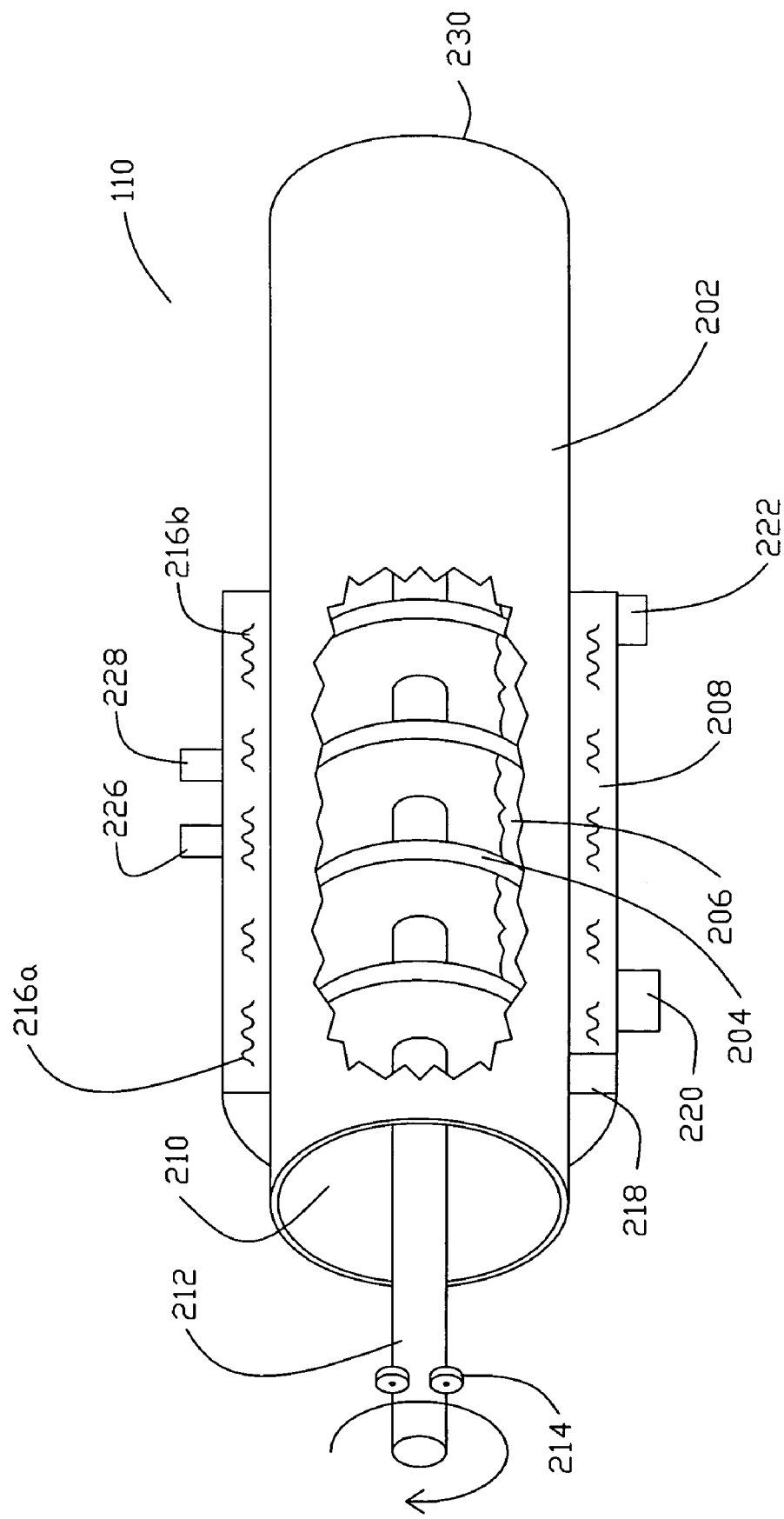
FIG. 2 shows an isometric view of the heated auger.

FIG. 2 shows a view of the heat tube 110 of the processor 100. The heat tube 110 can include an auger tube 202 through which an auger blade 204 passes. The auger blade 204 turns and moves food products such as meat 206 through the auger tube 202 as heat is applied by a heater 208. Partially cooked meat is supplied to a first end 210 of the auger tube 202 from the fryer 108. An auger shaft 212 and bearings 214 can support the auger blade 204 for rotation. Meat 206 is constantly tumbled in the heat tube 110 to prevent clumping or burning of the meat 206.

The heater 208 can include a control 218 that uses data from temperature probes 220 and 222 as well as data from humidity and pressure probe 226 to monitor the conditions inside the tube 110. Additional heat can be applied to the tube 110 near the first end 210 or near the back end 230 of the tube depending upon conditions sensed. The heater 208 can be in the form of a hollow cylinder that surrounds the heat tube 110. The heater 208 can include first heat elements 216a and end heat elements 216b which can be controlled separately to control the rate of cooking differently in different sections of the heat tube 110. Heater 208 can provide heat through steam heat, electrical means such as heated coils and/or through fuel combustion. The heater 208 which can surround the heat tube 110 can hold pressure on the interior of the tube 110

In operation, and referring to all figures, raw meat 102 is selected for the processor 100. Because of the characteristics of the processor 100 a wider range of initial meats can be considered to achieve a final desired meat product. For example because of the controlled fat extraction fattier meat could be placed into the intake 102, the blender 104 and grinder 106 and still achieve a lean final meat product.

Meat can be partially cooked in an initial fryer 108. Some liquid and fat can be separated from the meat product at this point and flow to liquid separator 115. Then the meat can be augered into a heat tube 110 where the cooking is completed. Auger blades 204 carry meat 206 from a first end 210 of the heat tube 110 toward a back end 230. The temperature of the meat 206 is sensed by a temperature sensor 220. A target temperature can be set and if the actual meat temperature is below the set point then the temperature can be raised by increasing the heat energy applied by heater 208 near the first end 210 of the tube 110. The temperature probe 222 senses the final temperature of the meat and control 218 assures that the meat temperature has achieved at least a predetermined safe temperature as defined by regulations or contracts for example. The control 218 also assures that the meat temperature is not exceeding a maximum temperature where the meat would dry out or burn. Probe 226 senses moisture present in the cooking process and the control 218 can increase or decrease moisture take off or venting in response to the moisture sensed in the meat 206, in the atmosphere of the heat tube 110 or both. Moisture can escape the heated tube 110 through a vent 228, moisture and fat can also leave the tube 110 by draining out either end 210, 230 or through other drains, not shown, that could be provided along the length of heated tube 110. Liquid from the fryer 108, heat tube 110 and from the spin dryer 114 can be collected through in a liquid separator 115 and the fat can be further separated from the water.

Meat 206 exiting the heat tube 110 is fully cooked 112 and can be processed as batches or can auger directly into a spin dryer 114 where the speed of the spin and length of time spun can determine the final moisture and fat content of the meat 206. Liquid and fat separated 115 can be processed separately and the fat sold to separate markets. The water could be added back to the meat 206 if too much water was extracted in the process of reducing fat content for example. Cooked meat 206 is then packaged 116, irradiated 118 and stored 120 prior to final delivery and use by the end consumer. The resulting packaged meat product is pre-cooked for safety and ease of use, irradiated for economical storage and long shelf life and dried to achieve a desired moisture and fat content.

The invention claimed is:

1. A processor for producing a meat product, the processor comprising a meat intake, a heated tube having an auger for moving meat there through; a front end of said heated tube for receiving meat and a heater for applying heat to cook said meat; said processor further comprising a back end of said heat tube, wherein meat augered through said heat tube exits said heat tube and enters a mechanical dryer, wherein a control controls the application of heat to said front end of said tube in response to a heat sensor located adjacent said front end and controls the application of heat to said back end of said heat tube responsive to a sensor adjacent the back end of said heat tube.

2. The processor of claim 1 further including a packager receiving the meat from said heated tube and mechanical dryer and packaging the meat.

3. The processor of claim 1 wherein said mechanical drier includes a centrifugal drier that dries the meat.

4. The processor of claim 1 wherein a vent controls the release of moisture during cooking in said heat tube and further including an irradiator for irradiating the meat.

5. A method of processing meat including the steps of
   intaking the meat
   blending the meat,
   frying the meat in a batch and separating off liquid,
   further heating the meat in a heat tube as the meat is augered through the heat tube,
   wherein the step of heating the meat in a heat tube as the meat is augered through further includes independently controlling the temperature of the heat tube at a front end as the meat enters the tube and at the back end of the tube as the meat exits the tube to assure that the meat reaches a desired temperature
   drying the meat to remove moisture and fat, packaging the meat into meat packages and irradiating the meat after it is in the packages.

6. The method of claim 5 wherein the step of drying the meat includes centrifugal spinning.

7. The method of claim 6 including grinding said meat prior to the step of frying.

8. The method of claim 6 wherein the moisture in said heat tube is monitored and controlled as said meat is augered through the heat tube.

9. A processor for producing a meat product, the processor comprising a meat intake, a heated tube having a means for moving meat there through; a front end of said heated tube for receiving meat and a heater for applying heat to cook said meat; said processor further comprising a back end of said heat tube, wherein meat moved through said heat tube exits said heat tube and enters a mechanical dryer, wherein said control controls the temperature at the front end of said tube independent from the temperature at said exit of said heat tube such that said meat can reach the desired temperature without a portion of the meat overheating, further including an irradiator for irradiating the meat.

10. The processor of claims 9 further including a grinder for grinding the meat and a batch fryer that fries the meat prior to it entering the heated tube.

11. The processor of claim 10 wherein the mechanical dryer includes a centrifugal spin dryer that controls the moisture content of the meat based on the spin speed and duration.

12. The processor of claim 11 including a packager that places meat in packages after the meat is dried in said mechanical dryer.

13. The processor of claim 12 wherein said meat is irradiated in an irradiator after it is packaged to provide a precooked, packaged meat with a long shelf life.

14. The processor of claim 13 wherein said means for moving said meat includes an auger that moves and tumbles the meat as it cooks in said heat tube.

15. The processor of claim 14 wherein said heat tube includes a control that controls the temperature within said heat tube to assure said meat temperature meets a desired temperature within said heat tube.

* * * * *